(12) United States Patent
Kondapalli

(10) Patent No.: US 8,036,113 B2
(45) Date of Patent: Oct. 11, 2011

(54) PACKET SAMPLING USING RATE-LIMITING MECHANISMS

(75) Inventor: Raghu Kondapalli, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 426 days.

(21) Appl. No.: 11/825,556

(22) Filed: Jul. 6, 2007

(65) Prior Publication Data

US 2007/0258370 A1    Nov. 8, 2007

Related U.S. Application Data

(63) Continuation-in-part of application No. 11/256,465, filed on Oct. 21, 2005, now Pat. No. 7,646,718.

(60) Provisional application No. 60/823,205, filed on Aug. 22, 2006.

(51) Int. Cl.
 *H04L 12/26* (2006.01)
(52) U.S. Cl. .................................... 370/230; 370/235
(58) Field of Classification Search .................. 370/412, 370/392, 389, 235; 709/232
 See application file for complete search history.

(56) References Cited

U.S. PATENT DOCUMENTS

| | | | |
|---|---|---|---|
| 6,578,082 B1 | 6/2003 | Ho | |
| 6,615,271 B1 * | 9/2003 | Lauck et al. | 709/232 |
| 6,826,150 B1 | 11/2004 | Bhattacharya | |
| 7,613,201 B1 | 11/2009 | Yang et al. | |
| 2001/0012272 A1 | 8/2001 | Aubert | |
| 2002/0152306 A1 | 10/2002 | Tuck | |
| 2002/0159460 A1 * | 10/2002 | Carrafiello et al. | 370/392 |
| 2003/0016686 A1 * | 1/2003 | Wynne et al. | 370/412 |
| 2003/0123390 A1 | 7/2003 | Takase | |
| 2004/0081169 A1 | 4/2004 | Kloth | |
| 2004/0105435 A1 | 6/2004 | Morioka | |
| 2005/0019033 A1 | 1/2005 | Oh | |
| 2005/0141426 A1 | 6/2005 | Hou | |
| 2006/0039374 A1 * | 2/2006 | Belz et al. | 370/389 |
| 2006/0187839 A1 * | 8/2006 | Smith et al. | 370/235 |
| 2007/0008975 A1 * | 1/2007 | Kalkunte | 370/392 |
| 2008/0212472 A1 | 9/2008 | Musacchio | |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

(Continued)

*Primary Examiner* — Kwang B Yao
*Assistant Examiner* — Syed Bokhari

(57) ABSTRACT

Apparatus having related methods and computer programs comprises an input circuit and one or more output circuits; a forwarding engine to transfer packets to the output circuits; and a rate limiting circuit to selectively pass packets from the input circuit to the forwarding engine, the rate limiting circuit comprising a counter to keep a count, an increment circuit to increment the count when the input circuit receives a packet, a decrement circuit to decrement the count by a decrement amount, an action circuit to perform action(s) based on the count and count threshold(s), and a configuration register to store a sampling flag, wherein when the sampling flag is set, the decrement amount is set to zero and the actions include sending a packet to a predetermined destination, and setting the count to zero, when the count exceeds a count threshold.

34 Claims, 6 Drawing Sheets

OTHER PUBLICATIONS

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11b-1999/Cor Jan. 2001 (Corrigendum to IEEE Std 802.11-1999); IEEE Standard for Information technology—Telecommunications and information exchange between systems—Local and metropolitan area networks—Specific requirements—Part 11: Wireless LAN Medium Access Control (MAC) and Physical Layer (PHY) specifications: Amendment 2: Higher-speed Physical Layer (PHY) extension in the 2.4 GHz Band—Corrigendum 1; LAN/MAN Standards Committee of the IEEE Computer Society; Nov. 7, 2001; 23 pages.

IEEE P802.11e/D11.0, Oct. 2004 (Amendment to ANSI/IEEE Std 802.11-1999 (2003 Reaff) edition as amended by IEEE Std 802.11g-2003, IEEE Stad 802.11h-2003 and IEEE 802.11i-2004); IEEE Standard for Information technology—Telecommunications and information exchange between systems—Local and metropolitan area networks—Specific requirements—Part 11: Wireless Medium Access Control (MAC) and Physical Layer (PHY) specifications: Amendment 7: Medium Access Control (MAC) Quality of Service (QoS) Enhancements; LAN/MAN Committee of the IEEE Computer Society; 185 pages.

IEEE P802.11g/D8.2, Apr 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE P802.11i/D10.0, Apr. 2004 (Amendment t ANSI/IEEE Std 802.11-1999 (2003 Reaff) edition as amended by IEEE Std 802.11g-2003 and IEEE Std 802.11h-2003); IEEE Standard for Information technology—Telecommunications and information exchange between systems—Local and metropolitan area networks—Specific requirements—Part 11: Wireless Medium Access Control (MAC) and Physical Layer (PHY) specifications: Amendment 6: Medium Access Control (MAC) Security Enhancements; LAN/MAN Committee of the IEEE Computer Society; 178 pages.

IEEE P802.11k/D10.0, Nov. 2007; Draft Standard for Information technology—Telecommunications and information exchange between systems—Local and metropolitan area networks—Specific requirements—Part 11: Wireless LAN Medium Access Control (MAC) and Physical Layer (PHY) specifications: Amendment 1: Radio Resource Measurement of Wireless LAN's; LAN/MAN Standards Committee of the IEEE Computer Society; 223 pages.

802.11n; IEEE P802.11-04/0889r6; Wireless LANs, TGn Sync Proposal Technical Specification; May 2005; 131 pages.

IEEE P802.11v/D1.02, Sep. 2007; Draft Standard for Information technology—Telecommunications and information exchange between systems—Local and metropolitan area networks—Specific requirements—Part 11: Wireless LAN Medium Access Control (MAC) and Physical Layer (PHY) specifications: Amendment 9: Wireless Network Management; 204 pages.

IEEE P802.11w/D4.0, Nov. 2007; Draft Standard for Information technology—Telecommunications and information exchange between systems—Local and metropolitan area networks—Specific requirements—Part 11: Wireless LAN Medium Access Control (MAC) and Physical Layer (PHY) specifications: Amendment 5: Protected Management Frames; 55 pages.

IEEE Std 802.16/2004 (Revision of IEEE Std 802.16/2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE 802.20-PD-06, IEEE p. 802.20 V14, Jul. 16, 2004, Draft 802.20 Permanent Document, System Requirements for IEEE 802.20 Mobile Broadband Wireless Access Systems—Version 14, 23 pages.

Leaky Bucket, from Wikipedia, Aug. 12, 2005; 3 pages.

Token Bucket, from Wikipedia, Aug. 10, 2005, 2 pages.

Address Resolution Protocol (arp), Aug. 10, 2005; 3 pages.

BPDU, from Wikipedia, Aug. 10, 2005, 1 page.

DOCSIS, from Wikipedia, Aug. 12, 2005, 3 pages.

IEEE Std 801.1X-2004 (Revision of IEEE Std 802.1X-2001), IEEE Standard for Local and metropolitan area networks, Port-Based Network Access Control; IEEE Computer Society, Sponsored by the LAN/MAN Standards Committee, Dec. 13, 2004; 179 pages.

* cited by examiner

PACKET SAMPLING USING RATE-LIMITING MECHANISMS

This application is a continuation-in-part of U.S. patent application Ser. No. 11/256,465, filed Oct. 21, 2005; the disclosure thereof is incorporated by reference herein in its entirety.

This application claims the benefit of U.S. Provisional Patent Application Ser. No. 60/823,205, filed Aug. 22, 2006; the disclosure thereof is incorporated by reference herein in its entirety.

BACKGROUND

The present invention relates generally to data communications. More particularly, the present invention relates to packet sampling using rate-limiting mechanisms.

SUMMARY

In general, in one aspect, the invention features an apparatus comprising: an input circuit to receive packets; one or more output circuits to transmit the packets; a forwarding engine to transfer the packets to one or more of the output circuits; and a rate limiting circuit to selectively pass the packets from the input circuit to the forwarding engine, the rate limiting circuit comprising a counter to keep a count, an increment circuit to increment the count by an increment amount when the input circuit receives one of the packets, a decrement circuit to decrement the count by a decrement amount at a decrement rate, an action circuit to perform one or more actions based on the count and one or more count thresholds, and a configuration register to store a sampling flag, wherein when the sampling flag is set, the decrement amount is set to zero and the actions include causing a copy of one of the packets to be sent to a predetermined sampling destination, and setting the count to zero, when the count exceeds a first one of the count thresholds.

In some embodiments, the decrement rate represents a committed information rate (CIR). In some embodiments, the action circuit comprises: a first action circuit to perform one or more first actions when the sampling flag is clear and the count exceeds the first one of the count thresholds, and wherein the first actions include transferring one of the packets from the input circuit to the forwarding engine, discarding the one of the packets, and transmitting a flow control message to a source of the one of the packets. In some embodiments, the first threshold represents an Excess Burst Size (EBS). In some embodiments, the action circuit further comprises: a second action circuit to perform one or more of the first actions when the sampling flag is clear and the count does not exceed the first one of the count thresholds but exceeds a second one of the count thresholds, and wherein the first one of the count thresholds exceeds the second one of the count thresholds. In some embodiments, the second threshold represents a Committed Burst Size (CBS). In some embodiments, the action circuit further comprises: a third action circuit to perform one or more second actions when the sampling flag is clear and the count does not exceed a third one of the count thresholds, wherein the second one of the count thresholds exceeds the third one of the count thresholds, and wherein the second actions include transferring one of the packets from the input circuit to the forwarding engine. Some embodiments comprise a network device comprising the apparatus. In some embodiments, the network device is selected from the group consisting of: a network switch; a router; and a network interface controller. Some embodiments comprise a wireless network device incorporating the apparatus, wherein the wireless network device is compliant with at least one of a plurality of standards including IEEE standards 802.11, 802.11a, 802.11b, 802.11g, 802.11n, 802.16, and 802.20.

In general, in one aspect, the invention features an apparatus comprising: input means for receiving packets; one or more output means for transmitting the packets; forwarding means for transferring the packets to one or more of the output means; and rate limiting means for selectively passing the packets from the input means to the forwarding means, the rate limiting means comprising counting means for keeping a count, incrementing means for incrementing the count by an increment amount when the input means receives one of the packets, decrement means for decrementing the count by a decrement amount at a decrement rate, action means for performing one or more actions based on the count and one or more count thresholds, and register means for storing a sampling flag, wherein when the sampling flag is set, the decrement amount is set to zero and the actions include causing a copy of one of the packets to be sent to a predetermined sampling destination, and setting the count to zero, when the count exceeds a first one of the count thresholds.

In some embodiments, the decrement rate represents a committed information rate (CIR). In some embodiments, the action means comprises: first action means for performing one or more first actions when the sampling flag is clear and the count exceeds the first one of the count thresholds, and wherein the first actions include transferring one of the packets from the input means to the forwarding means, discarding the one of the packets, and transmitting a flow control message to a source of the one of the packets. In some embodiments, the first threshold represents an Excess Burst Size (EBS). In some embodiments, the action means further comprises: second action means for performing one or more of the first actions when the sampling flag is clear and the count does not exceed the first one of the count thresholds but exceeds a second one of the count thresholds, and wherein the first one of the count thresholds exceeds the second one of the count thresholds. In some embodiments, the second threshold represents a Committed Burst Size (CBS). In some embodiments, the action means further comprises: third action means for performing one or more second actions when the sampling flag is clear and the count does not exceed a third one of the count thresholds, wherein the second one of the count thresholds exceeds the third one of the count thresholds, and wherein the second actions include transferring one of the packets from the input means to the forwarding means. Some embodiments comprise a network device comprising the apparatus. In some embodiments, the network device is selected from the group consisting of: a network switch; a router; and a network interface controller. Some embodiments comprise a wireless network device incorporating the apparatus, wherein the wireless network device is compliant with at least one of a plurality of standards including IEEE standards 802.11, 802.11a, 802.11b, 802.11g, 802.11n, 802.16, and 802.20.

In general, in one aspect, the invention features a method comprising: receiving packets at an input circuit; transmitting the packets from one or more output circuits; transferring the packets from a forwarding engine to one or more of the output circuits; and selectively passing the packets from the input circuit to the forwarding engine, comprising keeping a count, incrementing the count by an increment amount when the input circuit receives one of the packets, decrementing the count by a decrement amount at a decrement rate, performing one or more actions based on the count and one or more count thresholds, and storing a sampling flag, wherein when the sampling flag is set, the decrement amount is set to zero and the actions include causing a copy of one of the packets to be sent to a predetermined sampling destination, and setting the count to zero, when the count exceeds a first one of the count thresholds.

In some embodiments, the decrement rate represents a committed information rate (CIR). Some embodiments comprise performing one or more first actions when the sampling flag is clear and the count exceeds the first one of the count thresholds, wherein the first actions include transferring one of the packets from the input circuit to the forwarding engine, discarding the one of the packets, and transmitting a flow control message to a source of the one of the packets. In some embodiments, the first threshold represents an Excess Burst Size (EBS). Some embodiments comprise performing one or more of the first actions when the sampling flag is clear and the count does not exceed the first one of the count thresholds but exceeds a second one of the count thresholds, wherein the first one of the count thresholds exceeds the second one of the count thresholds. In some embodiments, the second threshold represents a Committed Burst Size (CBS). Some embodiments comprise performing one or more second actions when the sampling flag is clear and the count does not exceed a third one of the count thresholds, wherein the second one of the count thresholds exceeds the third one of the count thresholds, and wherein the second actions include transferring one of the packets from the input circuit to the forwarding engine.

In general, in one aspect, the invention features a computer program executable on a processor, comprising: instructions for transferring packets from a forwarding engine to one or more output circuits; and instructions for selectively passing the packets from an input circuit to the forwarding engine, comprising instructions for keeping a count, instructions for incrementing the count by an increment amount when the input circuit receives one of the packets, instructions for decrementing the count by a decrement amount at a decrement rate, instructions for performing one or more actions based on the count and one or more count thresholds, and instructions for storing a sampling flag, wherein when the sampling flag is set, the decrement amount is set to zero and the actions include causing a copy of one of the packets to be sent to a predetermined sampling destination, and setting the count to zero, when the count exceeds a first one of the count thresholds.

In some embodiments, the decrement rate represents a committed information rate (CIR). Some embodiments comprise instructions for performing one or more first actions when the sampling flag is clear and the count exceeds the first one of the count thresholds, wherein the first actions include transferring one of the packets from the input circuit to the forwarding engine, discarding the one of the packets, and transmitting a flow control message to a source of the one of the packets. In some embodiments, the first threshold represents an Excess Burst Size (EBS). Some embodiments comprise instructions for performing one or more of the first actions when the sampling flag is clear and the count does not exceed the first one of the count thresholds but exceeds a second one of the count thresholds, wherein the first one of the count thresholds exceeds the second one of the count thresholds. In some embodiments, the second threshold represents a Committed Burst Size (CBS). Some embodiments comprise instructions for performing one or more second actions when the sampling flag is clear and the count does not exceed a third one of the count thresholds, wherein the second one of the count thresholds exceeds the third one of the count thresholds, and wherein the second actions include transferring one of the packets from the input circuit to the forwarding engine.

The details of one or more implementations are set forth in the accompanying drawings and the description below. Other features will be apparent from the description and drawings, and from the claims.

Figure 1:
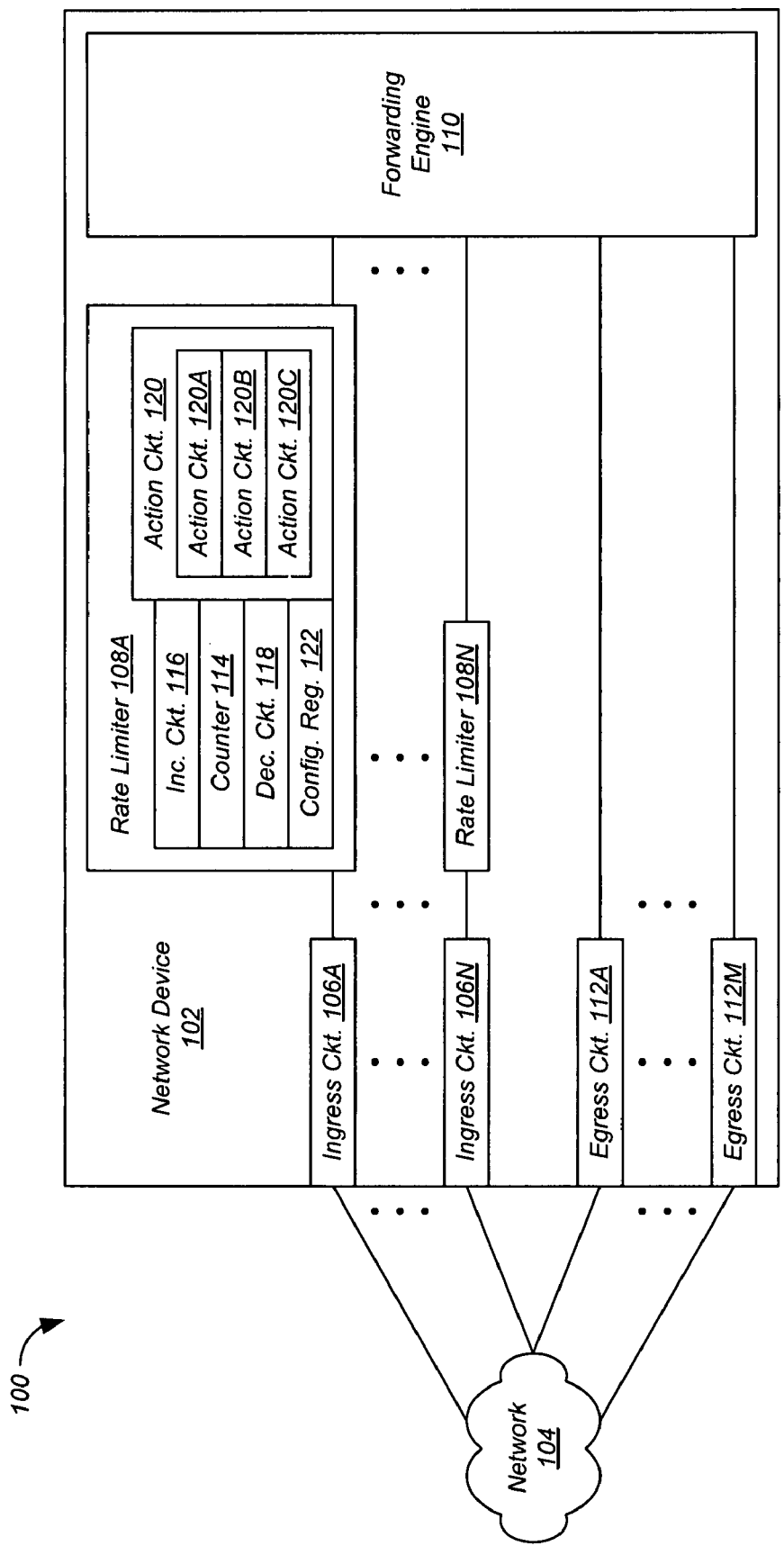
FIG. 1 shows a data communication system comprising a network device in communication with a network according to some embodiments of the present invention.

The leading digit(s) of each reference numeral used in this specification indicates the number of the drawing in which the reference numeral first appears.

DETAILED DESCRIPTION

As used herein, the term "mechanism" refers to hardware, software, or any combination thereof. These terms are used to simplify the description that follows. The mechanisms described herein can be implemented on any standard general-purpose computer or as specialized devices.

In many networking environments, it is desirable to limit the amount of traffic received from a particular network node or host. This is commonly accomplished using rate-limiting mechanisms. For example, a service provider can have service level agreements (SLAs) with its customers for providing access to the Internet backbone. These SLAs typically specify traffic information parameters such as Committed Information Rate (CIR), Committed Burst Size (CBS) and Excess Burst Size (EBS). In order to effectively enforce these information parameters, service providers can employ network devices comprising rate-limiting mechanisms to control traffic information rates. At least one such example rate-limiting mechanism is described in detail in U.S. patent application Ser. No. 11/256,465, filed Oct. 21, 2005; the disclosure thereof is incorporated by reference herein in its entirety.

It is also often desirable to sample the packets passing through a network device. For example, when a network device is used to mirror traffic to a mirror destination, sampling can be used to limit the amount of mirrored traffic. Conventional network devices implement rate-limiting and sampling mechanisms separately, for example as separate hardware modules, by implementing rate-limiting in hardware and sampling in software, and the like.

Embodiments of the present invention provide packet sampling using rate-limiting mechanisms. Rate-limiting mechanisms are generally applied at the input of a device so that the resources of the device are not consumed by traffic that is eventually discarded. However, embodiments of the present invention are not limited to ingress-side rate limiting and packet sampling, and can be employed at any point within a device.

FIG. 1 shows a data communication system 100 comprising a network device 102 in communication with a network 104 according to some embodiments of the present invention. Network 104 can be implemented as a wide-area network such as the Internet, a local-area network (LAN), multiple networks, or the like. While embodiments of the present invention are described with respect to network communications, they are equally applicable to devices employing other forms of data communications such as direct links and the like.

Although in the described embodiments, the elements of network device 102 are presented in one arrangement, other embodiments may feature other arrangements, as will be apparent to one skilled in the relevant arts based on the disclosure and teachings provided herein. For example, the elements of network device 102 can be implemented in hardware, software, or combinations thereof.

Network device 102 can be implemented as a switch, router, network interface controller (NIC), and the like. In some embodiments, network device 102 is implemented as a wireless network device. When implemented as a wireless network device, network device 102 can be compliant with all or part of IEEE standard 802.11, including draft and approved amendments such as 802.11a, 802.11b, 802.11e, 802.11g, 802.11i, 802.11k, 802.11n, 802.11v, and 802.11w.

Network device 102 includes one or more ingress circuits 106A-N, one or more rate limiters 108A-N, a forwarding engine 110, and one or more egress circuits 112A-M. At least one of rate limiters 108 includes a counter 114, an increment circuit 116, a decrement circuit 118, an action circuit 120, and a configuration register 122. For clarity, only one rate limiter 108A is shown as having these components. Of course, more than one rate limiter 108 can have these components.

Rate limiter 108A can operate in two different modes: rate-limiting mode and sampling mode. The mode can be controlled by a mode flag stored in configuration register 122. When the mode flag is set, rate limiter 108A operates in sampling mode. When the mode flag is clear, rate limiter 108A operates in rate-limiting mode.

Figure 2:
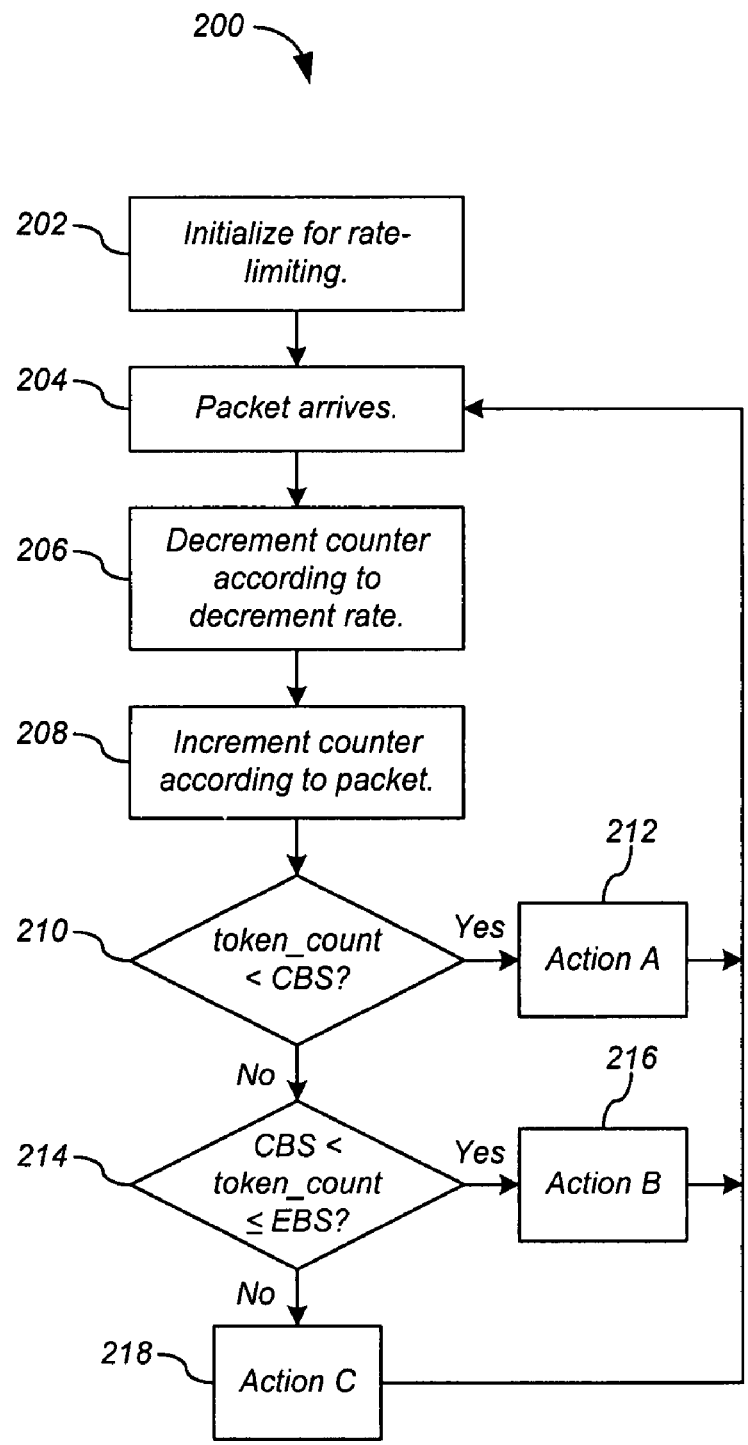
FIG. 2 shows a process for the network device of FIG. 1 when the rate limiter is in rate-limiting mode according to some embodiments of the present invention.

FIG. 2 shows a process 200 for network device 102 of FIG. 1 when rate limiter 108A is in rate-limiting mode according to some embodiments of the present invention. Although in the described embodiments, the elements of process 200 are presented in one arrangement, other embodiments may feature other arrangements, as will be apparent to one skilled in the relevant arts based on the disclosure and teachings provided herein.

Figure 3:
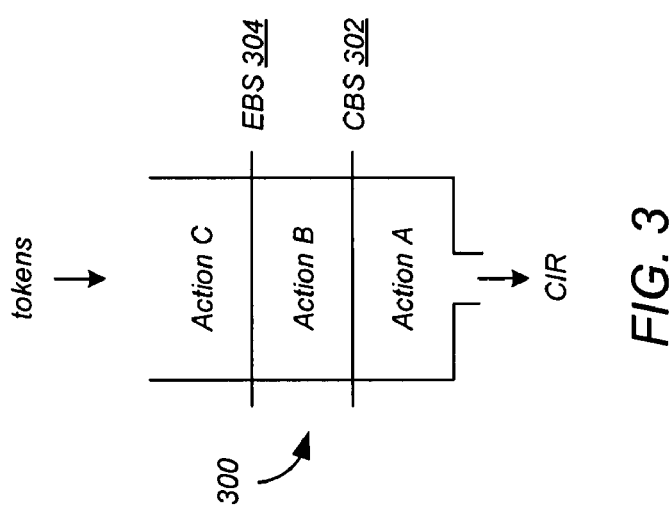
FIG. 3 shows a bucket according to some embodiments of the present invention.

Rate limiter 108A is in rate-limiting mode when the mode flag is clear in configuration register 122. Of course, other mechanisms can be used to set the mode of rate limiter 108A. When in rate-limiting mode, rate limiter 108A can employ a leaky bucket rate-limiting scheme. FIG. 3 shows a leaky bucket 300 according to some embodiments of the present invention.

Leaky bucket 300 receives tokens corresponding to packets received by the corresponding ingress circuit, here ingress circuit 106A. The number of tokens added to bucket 300 can represent a size of the received packet, or can be a fixed value regardless of packet size. Tokens flow out of bucket 300 at a predetermined rate, for example the Committed Information Rate (CIR) specified by a service level agreement (SLA).

Bucket 300 has two fullness thresholds 302 and 304, which can represent a Committed Burst Size (CBS) and an Excess Burst Size (EBS), respectively, specified by an SLA. When a number of tokens in bucket 300 does not exceed CBS 302, rate limiter 108A treats the packets according to a first action, shown in FIG. 3 as action A. When a number of tokens in bucket 300 exceeds CBS 302, but does not exceed EBS 304, rate limiter 108A treats the packets according to a second action, shown in FIG. 3 as action B. When a number of tokens in bucket 300 exceeds EBS 304, rate limiter 108A treats the packets according to a third action, shown in FIG. 3 as action C. Examples of these actions are described in detail below.

In some embodiments, each rate limiter 108 can employ multiple buckets 300, and a bucket 300 can apply to multiple rate limiters 108, for example as described in U.S. patent application Ser. No. 11/256,465, filed Oct. 21, 2005; the disclosure thereof is incorporated by reference herein in its entirety. However, for clarity, the operation of a single bucket 300 is described herein.

Each bucket 300 can be configured separately according to its resource settings, which can be stored in configuration register 122. Table 1 shows a table of example resource settings for a bucket 300 according to some embodiments of the present invention.

TABLE 1

| Parameter | Description |
| --- | --- |
| Action_A | Indicates action to be taken for packet when token_count ≦ CBS<br>= 2 pass packet |
| Action_B | Indicates action to be taken for packet when CBS < token_count ≦ EBS<br>= 0 discard packet<br>= 1 send flow control packet to packet source<br>= 2 pass packet |
| Action_C | Indicates action to be taken for packet when token_count > EBS<br>= 0 discard packet<br>= 1 send flow control packet to packet source<br>= 2 pass packet |
| EBS | Indicates Excess Burst Size |
| CBS | Indicates Committed Burst Size |
| update_interval | Indicates rate at which bucket 300 is to be updated with tokens.<br>= 1/CIR where CIR is the committed information rate |
| increment | Indicates the number of tokens to be added per bucket increment |
| RateType | Indicates the type of rate limiting employed by the rate limiter.<br>= 1 indicates bucket 300 is rate based<br>= 0 indicates bucket 300 is traffic type based |
| TypeMask | Further specifies the rate limiting<br>This field has the following definition if RateType = 1'b0;<br>[0] - Multicast<br>[1] - ARP<br>[2] - Pause<br>[3] - BPDU<br>[4] - TCP CTRL<br>[5] - TCP DATA<br>[6] - UDP<br>[7] - NonTCPUDP<br>This field has the following definition if RateType = 1'b1;<br>[0] - Frame mode;<br>[1] - Count layer1 bits;<br>[2] - Count layer2 bits;<br>[3] - Count layer3 bits; |
| token_count | Indicates the number of tokens in bucket 300. The initial value can be programmed by software as part of initialization. |
| last_updated_time | Indicates the last time bucket 300 was updated with tokens. |
| current_time_update_interval | Indicates the update interval for the current time. This parameter can be common to all |

TABLE 1-continued

| Parameter | Description |
| --- | --- |
| current_time | Indicates the current time. |
| rate_factor | Indicates how many tokens should be decremented from bucket 300 for each interval of time. |
| mode | Indicates the mode of the rate limiter<br>= 0 rate-limiting mode<br>= 1 sampling mode |

The parameter Action_A indicates what action is to be taken for a received packet when token_count≦CBS. For example, when Action_A=2, the packet is passed.

The parameter Action_B indicates what action is to be taken for a received packet when CBS<token_count≦EBS. For example, when Action_B=0 the packet is discarded, when Action_B=1 a flow control packet is sent to the packet source, and when Action_B=2 the packet is passed.

The parameter Action_C indicates what action is to be taken for a received packet when token_count>EBS. For example, when Action_C=0 the packet is discarded, when Action_C=1 a flow control packet is sent to the packet source, and when Action_C=2 the packet is passed.

The parameter EBS indicates the Excess Burst Size.

The parameter CBS indicates the Committed Burst Size.

The parameter update_interval indicates the rate at which bucket 300 is to be updated with tokens. For example, update_interval=1/CIR where CIR is the committed information rate.

The parameter increment indicates the number of tokens to be added per bucket increment.

The parameter RateType indicates the type of rate limiting employed by bucket 300. For example, when RateType=1 bucket 300 is rate based, and when RateType=0 bucket 300 is traffic type based.

The parameter TypeMask further specifies the rate limiting. For example, TypeMask has the definitions shown in Table 1.

The parameter token_count indicates the number of tokens in bucket 300. The initial value can be programmed by software as part of initialization.

The parameter last_updated_time indicates the last time bucket 300 was updated with tokens.

The parameter current_time_update_interval indicates the update interval for the current time. This parameter can be common to all ingress circuits 106 and/or buckets 300.

The parameter current_time indicates the current time. This parameter can be common to all ingress circuits 106 and/or buckets 300.

The parameter rate_factor indicates how many tokens should be decremented from bucket 300 for each interval of time, and so is directly proportional to the CIR (Committed Information Rate).

The parameter mode indicates the mode of rate limiter 108. For example, when mode=0 rate limiter 108 is in rate-limiting mode, and when mode=1 rate limiter 108 is in sampling mode.

Referring again to FIG. 2, rate limiter 108A first initializes certain values for rate-limiting (step 202). For example, the following values are initialized as shown in equations (1)-(3).

$$token\_count = CBS \quad (1)$$

$$last\_updated\_time = 0 \quad (2)$$

$$rate\_factor = increment/update\_interval \quad (3)$$

where token_count is the count kept by counter 114 of rate limiter 108A.

When a packet arrives (step 204), decrement circuit 118 of rate limiter 108 decrements counter 114, for example according to a decrement rate such as the CIR (step 206), and increment circuit 116 of rate limiter 108 increments counter 114 by an increment amount representing the received packet (step 208). For example, counter 114 is decremented according to equations (4) and (5), and incremented according to equations (6) and (7).

$$token\_decrement\_amount = (current\_time - last\_updated\_time) * rate\_factor \quad (4)$$

$$token\_count = token\_count - token\_decrement\_amount \quad (5)$$

where current_time is updated in intervals as specified by a current_time_update_interval value.

$$token\_increment\_amount = packet\_size \quad (6)$$

$$token\_count = token\_count + token\_increment\_amount \quad (7)$$

where the packet_size calculation is based on the field settings for rate_type and type_mask.

Action circuit 120 of rate limiter 108A then performs one or more actions based on the count token_count of counter 114 and one or more count thresholds. In the current example, referring to FIG. 3, leaky bucket 300 has two thresholds CBS 302 and EBS 304, and therefore three different actions A, B, and C. Referring again to FIG. 1, these three actions can be performed by three different action circuits 120A,B,C within action circuit 120 of rate limiter 108A.

Referring again to FIG. 2, when token_count of counter 114 does not exceed CBS 302 (step 210), action circuit 120A performs action A (step 212). For example, action A can include passing the packet, that is, transferring the packet to forwarding engine 110. Process 200 then resumes at step 204.

When token_count of counter 114 exceeds CBS 302, but does not exceed EBS 304 (step 214), action circuit 120B performs action B (step 216). For example, action B can include passing the packet, discarding the packet, and transmitting a flow control message to the source of the packet. Process 200 then resumes at step 204.

When token_count of counter 114 exceeds EBS 304, action circuit 120C performs action C (step 218). For example, action C can include passing the packet, discarding the packet, and transmitting a flow control message to the source of the packet. Process 200 then resumes at step 204.

Figure 4:
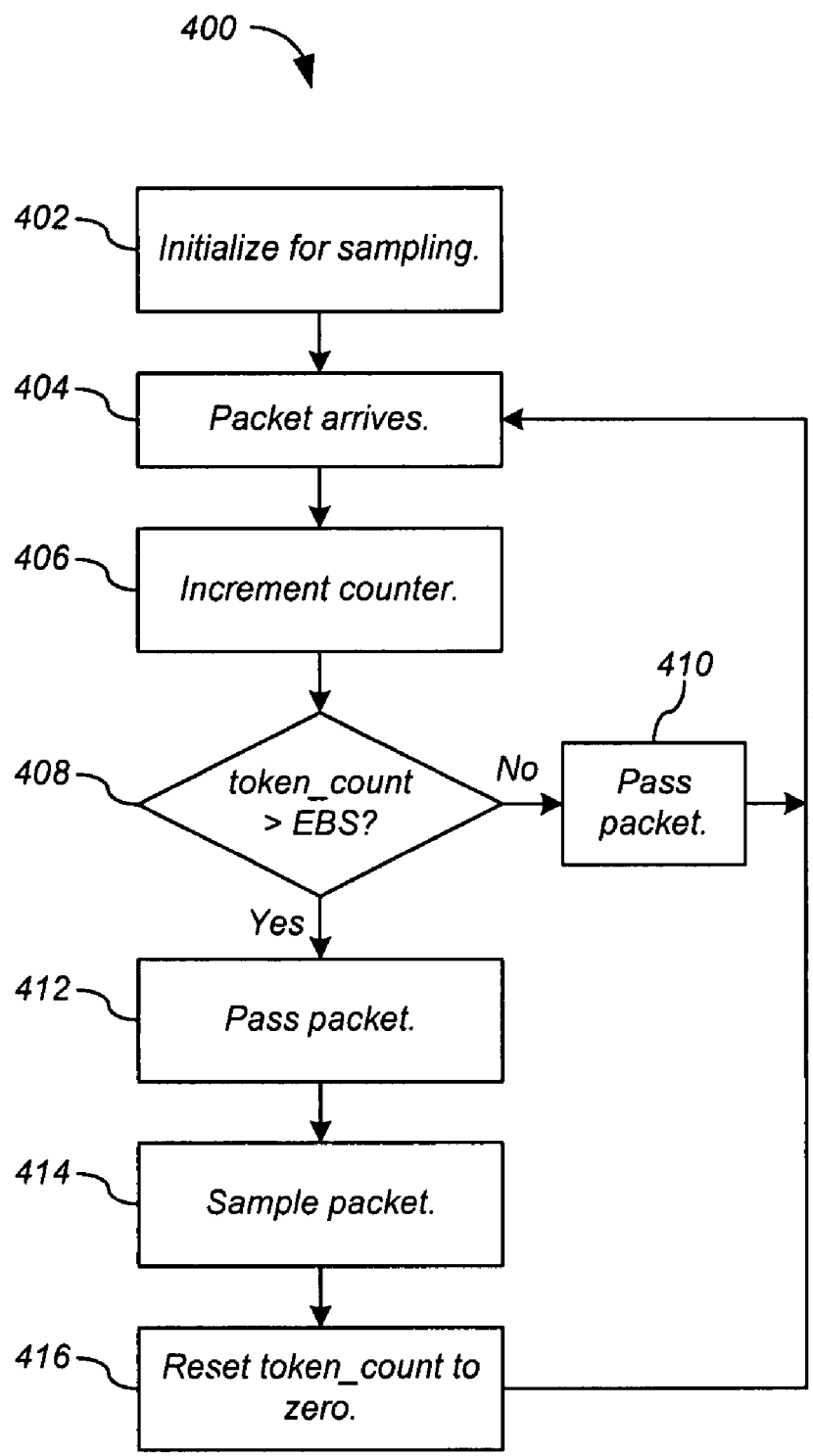
FIG. 4 shows a process for the network device of FIG. 1 when the rate limiter is in sampling mode according to some embodiments of the present invention.

As described above, rate limiter 108A can operate in either rate-limiting mode or sampling mode. FIG. 4 shows a process 400 for network device 102 of FIG. 1 when rate limiter 108A is in sampling mode according to some embodiments of the present invention. Although in the described embodiments, the elements of process 400 are presented in one arrangement, other embodiments may feature other arrangements, as will be apparent to one skilled in the relevant arts based on the disclosure and teachings provided herein.

Rate limiter 108A is in sampling mode when the mode flag is set in configuration register 122. Of course, other mechanisms can be used to set the mode of rate limiter 108A. When in sampling mode, rate limiter 108A can employ a modified form of the leaky bucket scheme shown in FIG. 3, thereby providing packet sampling using rate-limiting mechanisms.

In some embodiments, each rate limiter 108 can employ multiple buckets 300, and a bucket 300 can apply to multiple rate limiters 108, for example as described in U.S. patent application Ser. No. 11/256,465, filed Oct. 21, 2005; the disclosure thereof is incorporated by reference herein in its entirety. However, for clarity, the operation of a single bucket 300 is described herein.

Referring again to FIG. 4, rate limiter 108A first initializes certain values for sampling (step 402). For example, the following values are initialized as shown in equations (8)-(12).

$$\text{token\_count}=0 \tag{8}$$

$$\text{last\_update time}=0 \tag{9}$$

$$\text{rate\_factor}=0 \tag{10}$$

$$\text{token\_increment\_amount}=1 \tag{11}$$

$$CBS=1 \tag{12}$$

where token_count is the count kept by counter 114 of rate limiter 108A. With the initialization of step 402, EBS becomes the packet sampling rate, and can be set to any desired value.

When a packet arrives (step 404), in contrast to rate-limiting mode, decrement circuit 118 of rate limiter 108A does not decrement counter 114 because rate_factor=0 for sampling mode. Increment circuit 116 of rate limiter 108 increments counter 114 (step 406). For example, counter 114 is incremented according to equation (13).

$$\text{token\_count}=\text{token\_count}+\text{token\_increment\_amount} \tag{13}$$

But because token_increment_amount=1 for sampling mode, counter 114 is always incremented by one when rate limiter 108A is in sampling mode.

Action circuit 120 of rate limiter 108A then performs one or more actions based on the count token_count of counter 114 and one or more count thresholds. In the current example, referring to FIG. 3, because CBS=1, bucket 300 effectively has one threshold EBS 304, where EBS 304 is the packet sampling rate.

Referring again to FIG. 4, when token_count of counter 114 does not exceed EBS 304 (step 408), action circuit 120 passes the packet, that is, transfers the packet to forwarding engine 110 (step 410). Process 400 then resumes at step 404.

When token_count of counter 114 exceeds EBS 304 (step 408), action circuit 120 not only passes the packet (step 412), but also samples the packet (step 414), for example by sending a copy of the packet to a predetermined sampling destination. Action circuit 120 also resets the token_count of counter 114 to zero (step 416). Process 400 then resumes at step 404.

Figure 5A:
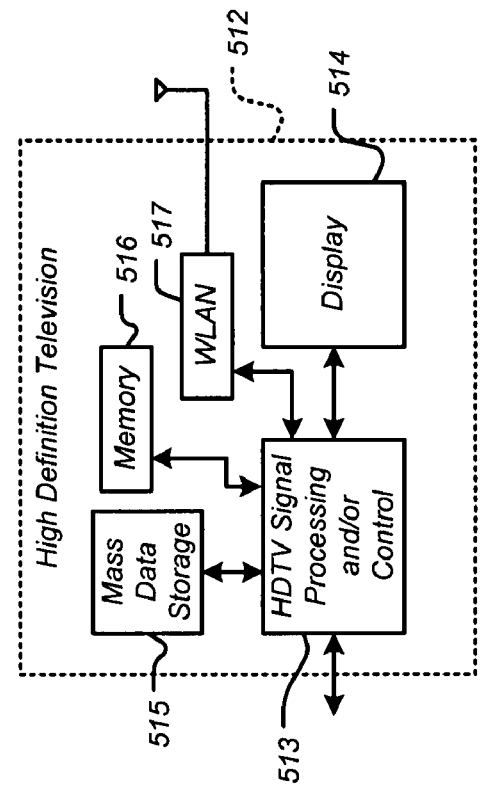
FIGS. 5A-5E show various exemplary implementations of the present invention.

FIGS. 5A-5E show various exemplary implementations of the present invention. Referring now to FIG. 5A, the present invention can be implemented in a high definition television (HDTV) 512. The present invention may implement either or both signal processing and/or control circuits, which are generally identified in FIG. 5A at 513, a WLAN interface and/or mass data storage of the HDTV 512. The HDTV 512 receives HDTV input signals in either a wired or wireless format and generates HDTV output signals for a display 514. In some implementations, signal processing circuit and/or control circuit 513 and/or other circuits (not shown) of the HDTV 512 may process data, perform coding and/or encryption, perform calculations, format data and/or perform any other type of HDTV processing that may be required.

The HDTV 512 may communicate with mass data storage 515 that stores data in a nonvolatile manner such as optical and/or magnetic storage devices. The HDD may be a mini HDD that includes one or more platters having a diameter that is smaller than approximately 1.8". The HDTV 512 may be connected to memory 516 such as RAM, ROM, low latency nonvolatile memory such as flash memory and/or other suitable electronic data storage. The HDTV 512 also may support connections with a WLAN via a WLAN network interface 517.

Figure 5C:
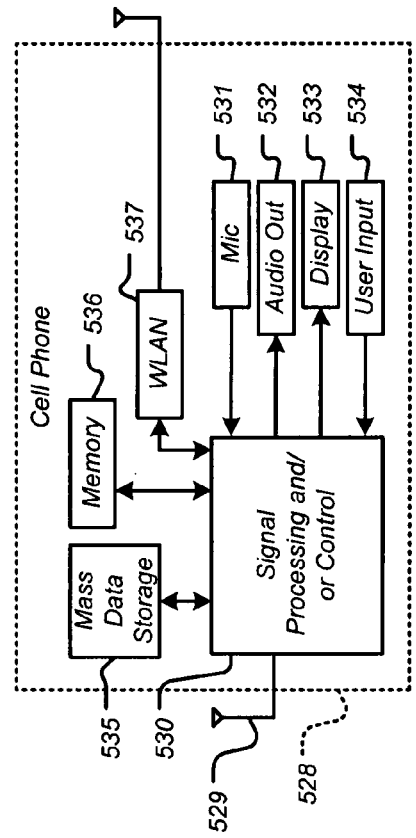
Figure 5B:
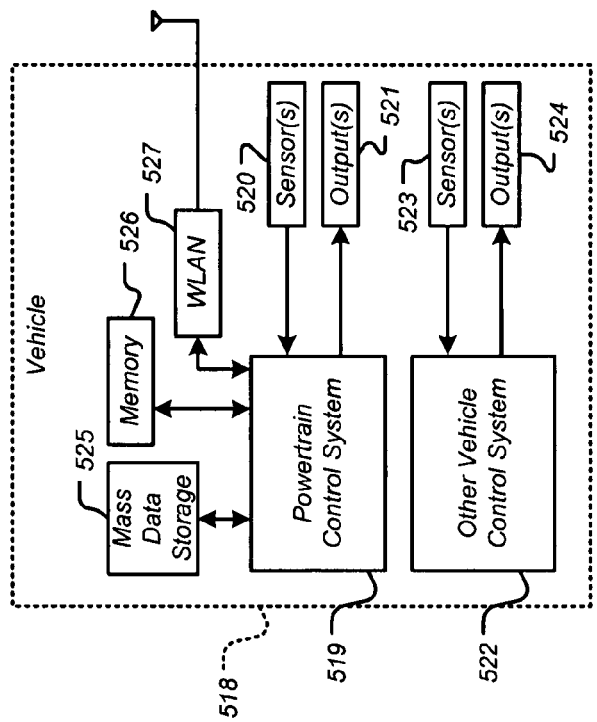

Referring now to FIG. 5B, the present invention implements a control system of a vehicle 518, a WLAN interface and/or mass data storage of the vehicle control system. In some implementations, the present invention implements a powertrain control system 519 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 522 of the vehicle 518. The control system 522 may likewise receive signals from input sensors 523 and/or output control signals to one or more output devices 524. In some implementations, the control system 522 may be part of an anti-lock braking system (ABS), a navigation system, a telematics system, a vehicle telematics system, a lane departure system, an adaptive cruise control system, a vehicle entertainment system such as a stereo, DVD drive, compact disc system and the like. Still other implementations are contemplated.

The powertrain control system 519 may communicate with mass data storage 525 that stores data in a nonvolatile manner. The mass data storage 525 may include optical and/or magnetic storage devices including HDDs and/or DVD drives. The HDD may be a mini HDD that includes one or more platters having a diameter that is smaller than approximately 1.8". The powertrain control system 519 may be connected to memory 526 such as RAM, ROM, low latency nonvolatile memory such as flash memory and/or other suitable electronic data storage. The powertrain control system 519 also may support connections with a WLAN via a WLAN network interface 527. The control system 522 may also include mass data storage, memory and/or a WLAN interface (all not shown).

Referring now to FIG. 5C, the present invention can be implemented in a cellular phone 528 that may include a cellular antenna 529. The present invention may implement either or both signal processing and/or control circuits, which are generally identified in FIG. 5C at 530, a WLAN interface and/or mass data storage of the cellular phone 528. In some implementations, the cellular phone 528 includes a microphone 531, an audio output 532 such as a speaker and/or audio output jack, a display 533 and/or an input device 534 such as a keypad, pointing device, voice actuation and/or other input device. The signal processing and/or control circuits 530 and/or other circuits (not shown) in the cellular phone 528 may process data, perform coding and/or encryption, perform calculations, format data and/or perform other cellular phone functions.

The cellular phone 528 may communicate with mass data storage 535 that stores data in a nonvolatile manner such as optical and/or magnetic storage devices including HDDs and/or DVD drives. The HDD may be a mini HDD that includes one or more platters having a diameter that is smaller than approximately 1.8". The cellular phone 528 may be connected to memory 536 such as RAM, ROM, low latency nonvolatile memory such as flash memory and/or other suitable electronic data storage. The cellular phone 528 also may support connections with a WLAN via a WLAN network interface 537.

Figure 5D:
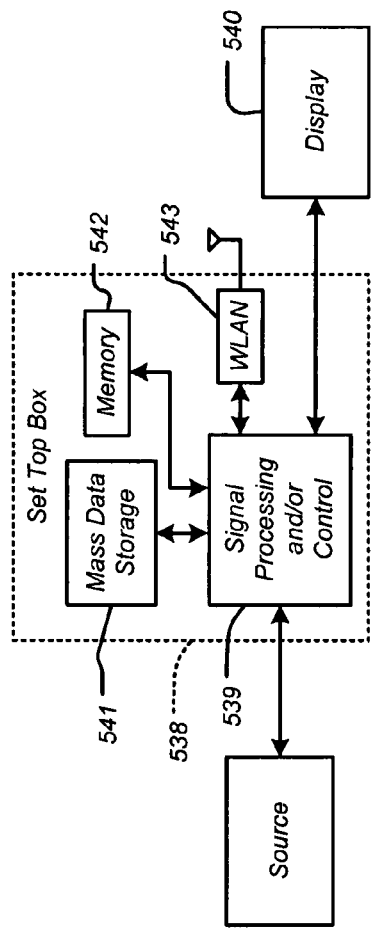

Referring now to FIG. 5D, the present invention can be implemented in a set top box 538. The present invention may implement either or both signal processing and/or control circuits, which are generally identified in FIG. 5D at 539, a WLAN interface and/or mass data storage of the set top box 538. The set top box 538 receives signals from a source such as a broadband source and outputs standard and/or high definition audio/video signals suitable for a display 540 such as a television, a monitor and/or other video and/or audio output devices. The signal processing and/or control circuits 539 and/or other circuits (not shown) of the set top box 538 may process data, perform coding and/or encryption, perform calculations, format data and/or perform any other set top box functions.

The set top box 538 may communicate with mass data storage 543 that stores data in a nonvolatile manner. The mass data storage 543 may include optical and/or magnetic storage devices including HDDs and/or DVD drives. The HDD may be a mini HDD that includes one or more platters having a diameter that is smaller than approximately 1.8". The set top box 538 may be connected to memory 542 such as RAM, ROM, low latency nonvolatile memory such as flash memory and/or other suitable electronic data storage. The set top box 538 also may support connections with a WLAN via a WLAN network interface 543.

Figure 5E:
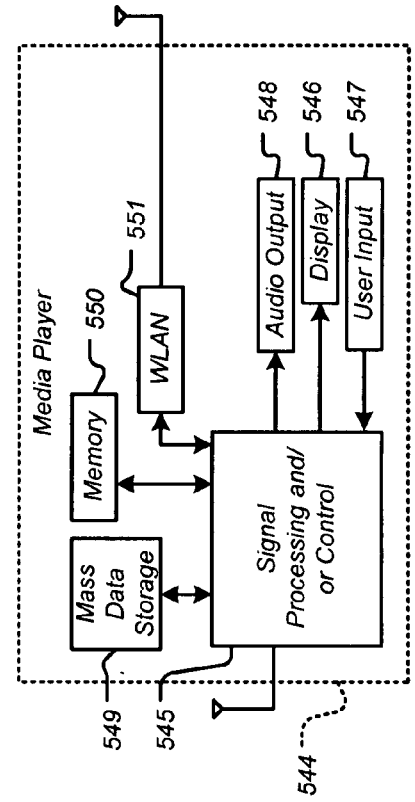

Referring now to FIG. 5E, the present invention can be implemented in a media player 544. The present invention may implement either or both signal processing and/or control circuits, which are generally identified in FIG. 5E at 545, a WLAN interface and/or mass data storage of the media player 544. In some implementations, the media player 544 includes a display 546 and/or a user input 547 such as a keypad, touchpad and the like. In some implementations, the media player 544 may employ a graphical user interface (GUI) that typically employs menus, drop down menus, icons and/or a point-and-click interface via the display 546 and/or user input 547. The media player 544 further includes an audio output 548 such as a speaker and/or audio output jack. The signal processing and/or control circuits 545 and/or other circuits (not shown) of the media player 544 may process data, perform coding and/or encryption, perform calculations, format data and/or perform any other media player functions.

The media player 544 may communicate with mass data storage 549 that stores data such as compressed audio and/or video content in a nonvolatile manner. In some implementations, the compressed audio files include files that are compliant with MP3 format or other suitable compressed audio and/or video formats. The mass data storage 549 may include optical and/or magnetic storage devices including HDDs and/or DVD drives. The HDD may be a mini HDD that includes one or more platters having a diameter that is smaller than approximately 1.8". The media player 544 may be connected to memory 550 such as RAM, ROM, low latency nonvolatile memory such as flash memory and/or other suitable electronic data storage. The media player 544 also may support connections with a WLAN via a WLAN network interface 551. Still other implementations in addition to those described above are contemplated.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:
1. An apparatus comprising:
an input circuit to receive packets;
one or more output circuits to transmit the packets;
a forwarding engine to transfer the packets to one or more of the output circuits; and
a rate limiting circuit to selectively pass the packets from the input circuit to the forwarding engine, the rate limiting circuit comprising:
 a counter to keep a count,
 an increment circuit to increment the count by an increment amount when the input circuit receives one of the packets,
 a decrement circuit to decrement the count by a decrement amount at a decrement rate,
 an action circuit to perform one or more actions based on the count and one or more count thresholds, and
 a configuration register to store a sampling flag,
 wherein when the sampling flag is set:
  the decrement amount is set to zero, and
  the one or more actions include, when the count exceeds a first one of the count thresholds, causing a copy of one of the packets to be sent to a predetermined sampling destination and resetting the count to zero.
2. The apparatus of claim 1:
wherein the decrement rate represents a committed information rate (CIR).
3. The apparatus of claim 1, wherein the action circuit comprises:
a first action circuit to perform one or more first actions when the sampling flag is clear and the count exceeds the first one of the count thresholds, and wherein the first actions include transferring one of the packets from the input circuit to the forwarding engine, discarding the one of the packets, and transmitting a flow control message to a source of the one of the packets.

4. The apparatus of claim 3:
wherein the first one of the count thresholds represents an Excess Burst Size (EBS).

5. The apparatus of claim 3, wherein the action circuit further comprises:
a second action circuit to perform one or more of the first actions when the sampling flag is clear and the count does not exceed the first one of the count thresholds but exceeds a second one of the count thresholds, and wherein the first one of the count thresholds exceeds the second one of the count thresholds.

6. The apparatus of claim 5:
wherein the second one of the count thresholds represents a Committed Burst Size (CBS).

7. The apparatus of claim 5, wherein the action circuit further comprises:
a third action circuit to perform one or more second actions when the sampling flag is clear and the count does not exceed a third one of the count thresholds, wherein the second one of the count thresholds exceeds the third one of the count thresholds, and wherein the second actions include transferring one of the packets from the input circuit to the forwarding engine.

8. A network device comprising the apparatus of claim 1.

9. The network device of claim 8, wherein the network device is selected from the group consisting of:
a network switch;
a router; and
a network interface controller.

10. A wireless network device incorporating the apparatus of claim 1, wherein the wireless network device is compliant with at least one of a plurality of standards including IEEE standards 802.11, 802.11a, 802.11b, 802.11g, 802.11n, 802.16, and 802.20.

11. An apparatus comprising:
input means for receiving packets;
one or more output means for transmitting the packets;
forwarding means for transferring the packets to one or more of the output means; and
rate limiting means for selectively passing the packets from the input means to the forwarding means, the rate limiting means comprising
counting means for keeping a count,
incrementing means for incrementing the count by an increment amount when the input means receives one of the packets,
decrement means for decrementing the count by a decrement amount at a decrement rate,
action means for performing one or more actions based on the count and one or more count thresholds, and
register means for storing a sampling flag,
wherein when the sampling flag is set:
the decrement amount is set to zero, and
the one or more actions include, when the count exceeds a first one of the count thresholds, causing a copy of one of the packets to be sent to a predetermined sampling destination and resetting the count to zero.

12. The apparatus of claim 11:
wherein the decrement rate represents a committed information rate (CIR).

13. The apparatus of claim 11, wherein the action means comprises:
first action means for performing one or more first actions when the sampling flag is clear and the count exceeds the first one of the count thresholds, and wherein the first actions include transferring one of the packets from the input means to the forwarding means, discarding the one of the packets, and transmitting a flow control message to a source of the one of the packets.

14. The apparatus of claim 13:
wherein the first one of the count thresholds represents an Excess Burst Size (EBS).

15. The apparatus of claim 13, wherein the action means further comprises:
second action means for performing one or more of the first actions when the sampling flag is clear and the count does not exceed the first one of the count thresholds but exceeds a second one of the count thresholds, and wherein the first one of the count thresholds exceeds the second one of the count thresholds.

16. The apparatus of claim 15:
wherein the second one of the count thresholds represents a Committed Burst Size (CBS).

17. The apparatus of claim 15, wherein the action means further comprises:
third action means for performing one or more second actions when the sampling flag is clear and the count does not exceed a third one of the count thresholds, wherein the second one of the count thresholds exceeds the third one of the count thresholds, and wherein the second actions include transferring one of the packets from the input means to the forwarding means.

18. A network device comprising the apparatus of claim 11.

19. The network device of claim 18, wherein the network device is selected from the group consisting of:
a network switch;
a router; and
a network interface controller.

20. A wireless network device incorporating the apparatus of claim 11, wherein the wireless network device is compliant with at least one of a plurality of standards including IEEE standards 802.11, 802.11a, 802.11b, 802.11g, 802.11n, 802.16, and 802.20.

21. A method comprising:
receiving packets at an input circuit;
transmitting the packets from one or more output circuits;
transferring the packets from a forwarding engine to one or more of the output circuits; and
selectively passing the packets from the input circuit to the forwarding engine, comprising
keeping a count,
incrementing the count by an increment amount when the input circuit receives one of the packets,
decrementing the count by a decrement amount at a decrement rate,
performing one or more actions based on the count and one or more count thresholds, and
storing a sampling flag,
wherein when the sampling flag is set:
the decrement amount is set to zero, and
the one or more actions include, when the count exceeds a first one of the count thresholds, causing a copy of one of the packets to be sent to a predetermined sampling destination and resetting the count to zero.

22. The method of claim 21:
wherein the decrement rate represents a committed information rate (CIR).

23. The method of claim 21, further comprising:
performing one or more first actions when the sampling flag is clear and the count exceeds the first one of the count thresholds, wherein the first actions include transferring one of the packets from the input circuit to the forwarding engine, discarding the one of the packets, and transmitting a flow control message to a source of the one of the packets.

24. The method of claim 23:
wherein the first one of the count thresholds represents an Excess Burst Size (EBS).

25. The method of claim 23, further comprising:
performing one or more of the first actions when the sampling flag is clear and the count does not exceed the first one of the count thresholds but exceeds a second one of the count thresholds, wherein the first one of the count thresholds exceeds the second one of the count thresholds.

26. The method of claim 25:
wherein the second one of the count thresholds represents a Committed Burst Size (CBS).

27. The method of claim 25, further comprising:
performing one or more second actions when the sampling flag is clear and the count does not exceed a third one of the count thresholds, wherein the second one of the count thresholds exceeds the third one of the count thresholds, and wherein the second actions include transferring one of the packets from the input circuit to the forwarding engine.

28. A tangible non-transitory computer readable medium that stores a computer program executable on a processor, the computer program comprising: instructions for transferring packets from a forwarding engine to one or more output circuits; and instructions for selectively passing the packets from an input circuit to the forwarding engine, comprising instructions for keeping a count, instructions for incrementing the count by an increment amount when the input circuit receives one of the packets, instructions for decrementing the count by a decrement amount at a decrement rate, instructions for performing one or more actions based on the count and one or more count thresholds, and instructions for storing a sampling flag, wherein when the sampling flag is set: the decrement amount is set to zero-, and the count exceeds a first one of the count thresholds, causing a copy of one of the packets to be sent to a predetermined sampling destination, and resetting the count to zero.

29. The tangible non-transitory computer readable medium claim 28: wherein the decrement rate represents a committed information rate (CIR).

30. The tangible non-transitory computer readable medium claim 28, further comprising: instructions for performing one or more first actions when the sampling flag is clear and the count exceeds the first one of the count thresholds, wherein the first actions include transferring one of the packets from the input circuit to the forwarding engine, discarding the one of the packets, and transmitting a flow control message to a source of the one of the packets.

31. The tangible non-transitory computer readable medium of claim 30:
wherein the first one of the count thresholds represents an Excess Burst Size (EBS).

32. The tangible non-transitory computer readable medium of claim 30, further comprising: instructions for performing one or more of the first actions when the sampling flag is clear and the count does not exceed the first one of the count thresholds but exceeds a second one of the count thresholds, wherein the first one of the count thresholds exceeds the second one of the count thresholds.

33. The tangible non-transitory computer readable medium of claim 32:
wherein the second one of the count thresholds represents a Committed Burst Size (CBS).

34. The tangible non-transitory computer readable medium claim 32, further comprising:
instructions for performing one or more second actions when the sampling flag is clear and the count does not exceed a third one of the count thresholds, wherein the second one of the count thresholds exceeds the third one of the count thresholds, and wherein the second actions include transferring one of the packets from the input circuit to the forwarding engine.

* * * * *